US012038860B2

(12) United States Patent
Katzav et al.

(10) Patent No.: US 12,038,860 B2
(45) Date of Patent: *Jul. 16, 2024

(54) VRAN WITH PCIE FRONTHAUL

(71) Applicant: Parallel Wireless, Inc., Nashua, NH (US)

(72) Inventors: Ofir Ben Ari Katzav, Zur Itshak (IL); David Johnston, Westford, MA (US); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,484

(22) Filed: Jan. 3, 2023

(65) Prior Publication Data

US 2023/0229614 A1 Jul. 20, 2023

Related U.S. Application Data

(63) Continuation of application No. 16/853,745, filed on Apr. 20, 2020, now Pat. No. 11,544,211.

(60) Provisional application No. 62/836,466, filed on Apr. 19, 2019.

(51) Int. Cl.
*G06F 13/40* (2006.01)
*G06F 13/42* (2006.01)
*H04B 1/16* (2006.01)

(52) U.S. Cl.
CPC ...... *G06F 13/4027* (2013.01); *G06F 13/4221* (2013.01); *G06F 13/4282* (2013.01); *H04B 1/16* (2013.01); *G06F 2213/0024* (2013.01); *G06F 2213/0026* (2013.01)

(58) Field of Classification Search
CPC ............ G06F 13/4027; G06F 13/4282; G06F 13/4221; G06F 2213/0026; G06F 2213/0024; H04B 1/16
USPC .......................... 710/8, 11, 14, 62, 105, 315
See application file for complete search history.

(56) References Cited

U.S. PATENT DOCUMENTS

| | | | | |
|---|---|---|---|---|
| 10,153,736 | B2* | 12/2018 | King | H03F 1/0277 |
| 10,817,392 | B1* | 10/2020 | McAuliffe | G06F 11/0727 |
| 2010/0332756 | A1* | 12/2010 | Yarch | G06F 11/1666 711/119 |
| 2013/0010773 | A1* | 1/2013 | Hong | H04W 88/10 370/338 |
| 2015/0303950 | A1* | 10/2015 | Shattil | H04B 1/0003 370/328 |
| 2018/0013465 | A1* | 1/2018 | Chiron | H03F 3/16 |
| 2019/0245740 | A1* | 8/2019 | Kachhla | H04L 41/04 |

* cited by examiner

*Primary Examiner* — Idriss N Alrobaye
*Assistant Examiner* — Henry W Yu
(74) *Attorney, Agent, or Firm* — Michael Y. Saji

(57) ABSTRACT

Systems, methods and computer software are disclosed for fronthaul. In one embodiment a method is disclosed, comprising: providing a virtual Radio Access Network (vRAN) having a centralized unit (CU) and a distributed unit (DU); and interconnecting the CU and DU over an Input/Output (I/O) bus using Peripheral Component Interconnect-Express (PCIe); wherein the CU and the DU include a PCI to optical converter and an optical to PCI converter.

20 Claims, 5 Drawing Sheets

VRAN WITH PCIE FRONTHAUL

CROSS-REFERENCE TO RELATED APPLICATIONS

This application is a continuation of U.S. application Ser. No. 16/853,745, filed Apr. 20, 2020, which claims priority under 35 U.S.C. § 119(e) to U.S. Provisional Pat. App. No. 62/836,466, filed Apr. 19, 2019, titled "vRAN with PCIe Fronthaul", each of which is hereby incorporated by reference in its entirety for all purposes. for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, 71721US01, 71729US01, 71730US01, 71731US01, 71756US01, 71775US01, 71865US01, and 71866US01, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. Features and characteristics of and pertaining to the systems and methods described in the present disclosure, including details of the multi-RAT nodes and the gateway described herein, are provided in the documents incorporated by reference.

BACKGROUND

Virtual Radio Access Network (vRAN) is a potential new architecture for cellular networks. In some embodiments of this architecture, a split is defined between a distributed unit (DU) and a centralized unit (CU) with a main goal to break the strong coupling of software and hardware design per standard. Moreover, 5G adaptation depends on the flexibility required for software modifications combined with even stronger requirement to keep/lower DU hardware installation/upgrade cost. In other words, the Virtual-RAN architecture can be defined such that DU hardware upgrades will be limited to not required during the evolution of 5G while digital baseband (BB) design, including Modem part, will be easily changeable by software upgrade. Such flexibility is achievable since the DU should run on a computationally strong centralized platform.

SUMMARY

Systems and methods for providing fronthaul are disclosed. In one embodiment, a method may be disclosed for providing fronthaul, comprising: providing a virtual Radio Access Network (vRAN) having a centralized unit (CU) and a distributed unit (DU); and interconnecting the CU and DU over an Input/Output (I/O) bus using Peripheral Component Interconnect-Express (PCIe); wherein the CU and the DU include a PCI to optical converter and an optical to PCI converter.

The DU and CU may be provided as at least one of a 2G, 3G, 4G and 5G network. The method may further comprise providing real-time data rate hit debug information between the CU and the DU using the PCIe mirrored memory capability. The method may further comprise providing side information to IQ sample streams. The method may further comprise providing frame synchronization between the CU and the DU using the PCIe mirrored memory capability.

In another embodiment, a non-transitory computer-readable medium containing instructions for providing fronthaul is disclosed. The instructions, when executed, cause a system to perform steps including providing a virtual Radio Access Network (vRAN) having a centralized unit (CU) and a distributed unit (DU); interconnecting the CU and DU over an Input/Output (I/O) bus using Peripheral Component Interconnect-Express (PCIe); and wherein the CU and the DU include a PCI to optical converter and an optical to PCI converter.

The method may further comprise instructions for providing additional DUs in communication with the CU over the I/O bus. Instructions for providing a CU may further comprise instructions for providing the CU as a PCIe master. Instructions for providing a DU may further comprise instructions for providing the DU as a PCIe slave. The method may further comprise for The DU and CU may be provided as at least one of a 2G, 3G, 4G and 5G network. The method may further comprise instructions for providing real-time data rate hit debug information between the CU and the DU using the PCIe mirrored memory capability. The method may further comprise instructions for providing side information to IQ sample streams. The method may further comprise instructions for providing frame synchronization between the CU and the DU using the PCIe mirrored memory capability.

In another embodiment, a system may be disclosed for providing a Diameter multifold message. The system may include a virtual Radio Access Network (vRAN) having a centralized unit (CU) and a distributed unit (DU); wherein the CU and DU are in communication with each other over an Input/Output (I/O) bus using Peripheral Component Interconnect-Express (PCIe); and wherein the CU and the DU include a PCI to optical converter and an optical to PCI converter.

The method may further comprise additional DUs in communication with the CU over the I/O bus. The system may be part of at least one of a 2G, 3G, 4G and 5G network. The PCIe mirrored memory capability may be used to provide real-time data rate hit debug information between the CU and the DU and to provide frame synchronization between the CU and the DU.

DETAILED DESCRIPTION

Various definitions of Virtual RAN entail several split options between the PHY/RF layers to the upper layers. The main differences between the split options are the required data rates and latency limitations, where, higher data rates will be needed when the split is done closer to the RF. To ease the challenging requirement for high data rates between the DU and CU, few split options were suggested inside the PHY/Modem. Such options divide the PHY layer to upper PHY (implemented at the CU) and lower PHY (implemented at the DU). Additional split option defined between the PHY and MAC layers. Splitting the PHY to upper and lower PHY seems to be the most beneficial alternative since it's well balancing the required data rates between the CU and DU as well as providing more flexibility for future modifications.

One of the main challenges in the vRAN architecture is the fronthaul infrastructure. By nature, advanced split options such as 8 or 7.x split the system around the PHY layer which shall be thought of as a serial/sequential domain. In other words, splitting the PHY between the DU and CU requires fronthaul that shall be as close as possible to serial/real-time interface. Few common fronthaul technologies are considered. The common one named CPRI, which transfers the IQ data between the two system's part sequentially and with close to fixed timing. In addition, such interface is capable, by design, to carry or generate synchronization between the DU and CU.

On the CU (BBU), it is advantageous to design using a common processor, for example, Intel's Xeon CPUs. Those types of CPUs can communicate with common PC interfaces such as Ethernet but cannot accept direct signaling of high-speed serial protocols such as CPRI. To overcome this issue, additional FPGA/HW accelerator is required to convert CPRI (or equivalent) communication into Ethernet (or equivalent) communication as a bridge between the DU "language" and the CU "language". Those kinds of protocol conversion FPGA/HW accelerators are costly and considered as burden to the vRAN deployment.

The present application proposes an alternative approach to design the vRAN fronthaul such that the protocol conversion FPGA/HW accelerator will be eliminated. Our approach can comply with the same synchronization and high data rate requirements from the vRAN fronthaul.

Split Options Overview

In this section we describe the split options alternatives as proposed by 3GPP, for splitting certain radio functions between a Centralized Unit (CU) and Radio Unit (RU).

Figure 1:
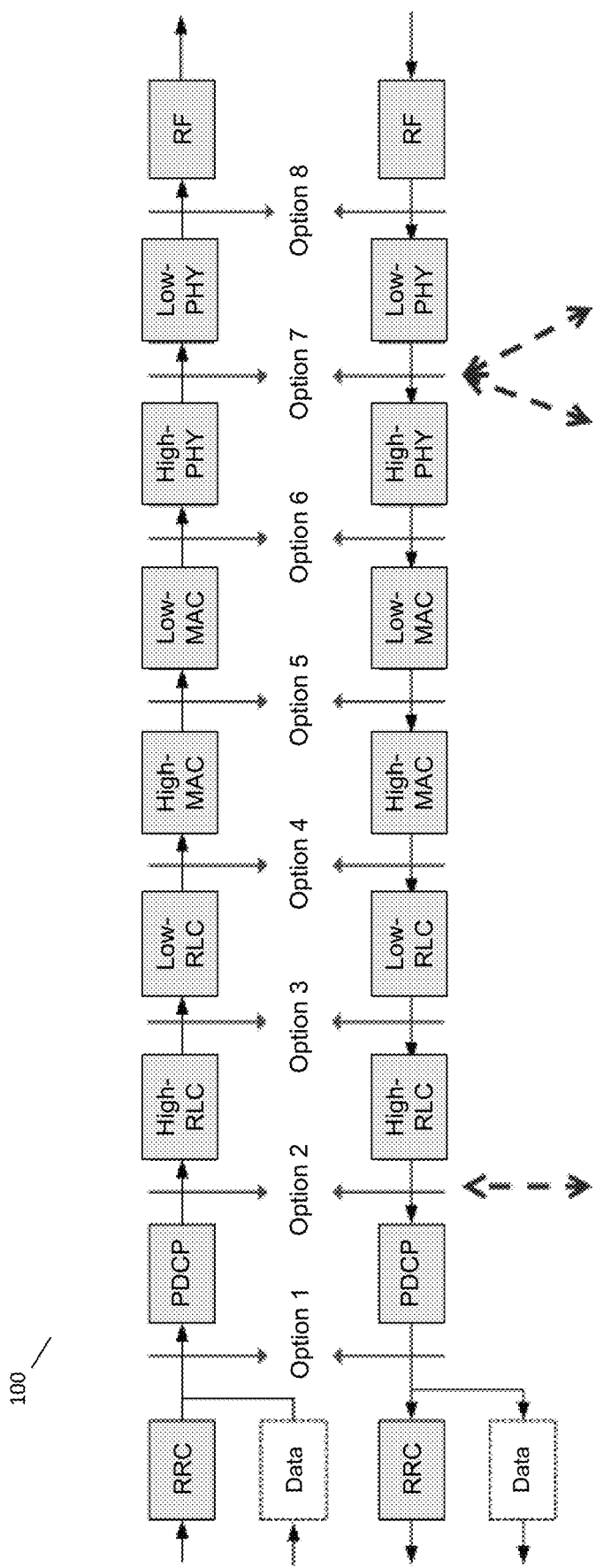
FIG. 1 is a diagram showing two split options format, in accordance with some embodiments.

Referring to FIG. 1, split options 1 to 8 100 are presented. Split option 8 defines a split at the ADC output and DAC input. This option is the most demanding one in terms of data rate and latency. Split option 7 defines a split within the PHY layer and will be discussed below. Split option 6 defines a split between the PHY and the MAC which is considered relatively easy to implement and doesn't require high data rates compared to split options 7 and 8. The inventors have contemplated the use of the present disclosure in particular with respect to Split option 2 101 and split option 7 102, which will be described in detail. Other options presented in FIG. 1 are not described here since those splits are technology dependent and of less interest, but are still contemplated as being appropriate for the use of the present disclosure, where appropriate, in some embodiments.

Figure 2:
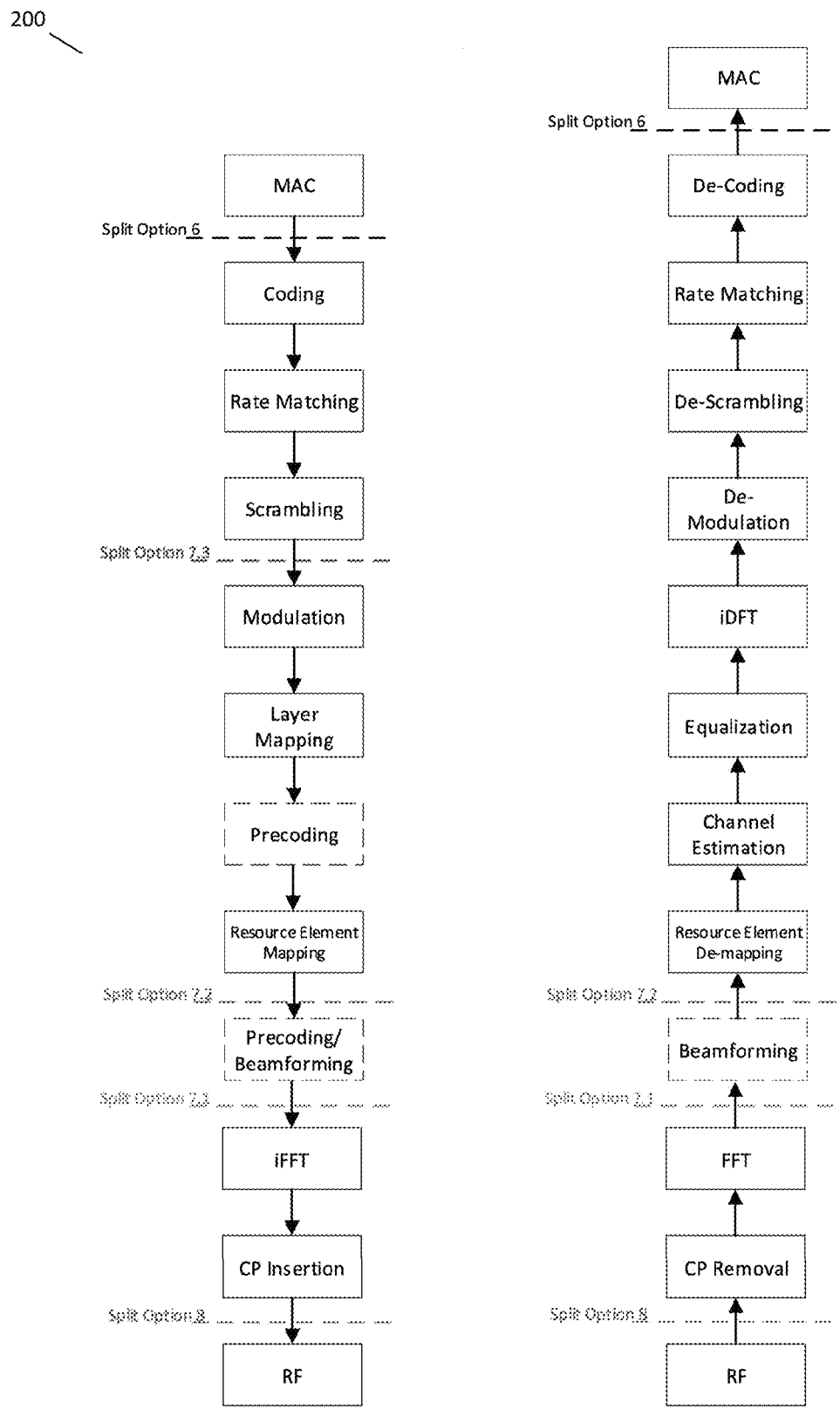
FIG. 2 is a diagram showing sub-options of split option 7, in accordance with some embodiments.

Split option 7 can be divided into sub-options as shown in FIG. 2. Split option 7.1 201 defines a split between the time-domain and frequency domains of the PHY. This option serves well the concept of easily changing the frequency domain implementation at the CU. Split option 7.2 includes the RE mapping and the beamforming handling on top of Split option 7.1. The main benefit of this option is the data rate relaxation (compared to option 7.1) required by the beamforming block. Split option 7.3 defines a split at the modulation block. It may or may not include the scrambling block.

An alternative to the common fronthaul protocols in vRAN architecture is contemplated by the present disclosure. The objectives of the proposed alternative are: Provide high data rates to satisfy the advanced split options (e.g. 7 and 8); and allow synchronization mechanism to be implemented between the CU and DU.

The inventors propose to use PCIe to connect the DU and CU in vRAN architecture. By doing so, the proposal eliminates the need for dedicated FPGA/HW accelerator to convert the CPRI (or equivalent) to a CPU-digestible protocol (e.g. Ethernet). This has the potential to save hundreds of dollars per CU. Note that the number of CUs in a deployment can be easily at the scale of 10K/100K. In some embodiments, using a CPU or SOC having PCIe built in for the DU or CU, or both, is contemplated.

No optical connection, e.g., fiber, is needed when PCIe is used to replace CPRI, in some embodiments, since the CU implements optical input/output able to work with PCIe protocol to eliminate any need for additional PCIe to optic convertor. The DU implements optical input/output able to work with PCIe protocol to eliminate any need for additional PCIe to optic convertor.

In an alternate embodiment, a PCIe to optical convertor or vice-versa can be used to create PCIe protocol communication over fiber optic between the CU and DU.

In some embodiments, PCIe's "Mirrored Memory" capabilities can be used to provide real-time and negligible data rate hit debug information between the DU and CU, and also to provide side information to the IQ samples stream. Such side information can be considered as RSSI, SNR, RF monitoring data and such. "Mirrored Memory" abilities can also be used for frame synchronization between the CU and DU. Any known protocol for frame synchronization, e.g., GPS sync, 1588, SyncE, could be used for frame synchronization, in some embodiments.

Multi-RAT data (data for two or more radio access technologies, e.g., 2G/3G/4G/5G/Wi-Fi) shall be carried over the same interface, in some embodiments. This is possible thanks to the scalability of PCIe data rates. PCIe protocol used for single CU communication with multiple DUs. Multi DU interconnection (e.g. daisy chaining) with PCIe protocol (over optical interface or copper interface) to reduce number of fronthaul links between the DU at (commonly) tower bottom and multiple DUs at tower top. Transfer of clock/synchronization signals over PCIe protocol between the DU and CU.

CU is defined as PCIe Master and all DUs as PCIe Slave and synchronization is distributed from CU to DUs. In that case, the CU can have GPS (or equivalent clock master abilities) and distribute it to all connected DUs. PCIe Master is initiated to be the CU. The system can allow new Master allocation to one of the DUs. Goal is to have DUs with GPS (or equivalent) synchronization capabilities and make him the PCIe Master to propagate the synchronization signals to other DUs and the CU.

One of the common communication protocols between a CPU to its peripheries is PCIe. The PCIe is considered as a short range, high rate bus with strong reliability and data rate scalability. By comparing PCIe and CPRI (the common vRAN fronthaul protocol), one can find similar properties in terms of data-rate capabilities. Moreover, the PCIe holds power efficiency features unlike the CPRI which can be beneficial for vRAN deployment. The main drawback for PCIe is the short-range communication capabilities over copper link. This drawback is irrelevant for vRAN architecture since in common deployment, an optical infrastructure will be the best choice as fronthaul infrastructure.

PCIe advantages include that the protocol is well-known. Drop-in easy to integrate to many chips. CPU already uses this for its peripherals so the CPU already understands this. Can save dollars per BBU because we don't need chips to convert Eth to CPRI. Mirrored memory is close to zero latency.

Moreover, the PCIe protocol capabilities exist on the CU side (on the CPU) as well as over the vast majority of RF SOCs/FPGAs used by DU manufacturers. Hence, adaptation of PCIe as a fronthaul infrastructure can be relatively quickly adopted.

PCIe disadvantages include short distance available—but this doesn't pose a problem here, as the long path is handled using optical. We will translate from optical to electrical and then inject into CPU.

A sampling mechanism on the copper interface is used to convert to optical samples (analogous to A/D-D/A). As PCI is SERDES, and as optical also presumes SERDES, at the simplest level, the PCI electrical signal can be connected to an optical transducer. Needs to be fast enough transducer, and typically would require a card with a bridge chip. The PCI may be specified as not doing spread spectrum clocking. You're going to use a card with the optical transducer with a PCI-PCI bridge, fixed clocking on the optical side and spread spectrum clocking on the PC side. Into transparent or non-transparent mode. One looks just like a PCI bus. So if you put a chip on the other side, architecture should be understood. Alternatively, you can do non-transparent mode and it doesn't look like a PCI bus. PCIe can be used over fiber.

Semi synchronization can be achieved by passing information between CU and DU. Assume very small latency between DU and CU, then you can use mirrored memory as an interrupt mechanism.

Daisy-chaining of, e.g., chips could be used, using repeaters in some embodiments. 1 to many (1:n) communications could be used, in some embodiments, for example using the same methods used for 1:n PCIe communications.

In some embodiments, a DU provides info to an RRH node; this can be called master (DU) to slave (RRH) communications, in some embodiments. In some embodiments, in the case that one of the nodes, for example, the DU, has a GPS connection, the DU may be treated as the master; in other embodiments, the master can be the CU. In some embodiments, any single node can be identified as the master; in other embodiments, each node can write to their own data bus or portion thereof, and other nodes will come and get the information.

As a further discussion of this concept, it is noted that typically, on a shared bus one central computing element but could be any collection of devices. For example, an Intel Broadwell CPU can do a write cycle or a read cycle whenever it is configured to do so. However, the CPU is limited in capability, and especially in the read direction, if you want to try to move buses by having the computer actually do all the read and write cycles, your computer will be brought to its knees. So, PCIe devices typically use linked list buffers, and the peripheral devices do the data moving and "master" the bus (i.e., read or write to the bus). But PCI is designed with the presumption that the high performance peripherals will move data on its own. Each device for example writes to its own bus and [you use DMA, direct memory access] and the other device will come get it. You don't put the data on the bus. By contrast, in the present disclosure, in some embodiments either or both of the DU or the CU can take control of reads and writes on the bus ("master" the bus); in other embodiments, the shared master/DMA model is enabled for the DU/CU.

In some embodiments, a transparent or non-transparent bridge can be used. PCI is a bus. CPRI is an interface. So it's how you use the bus efficiently that is one key. Various embodiments are contemplated wherein different devices create the packet and move the data across the bus.

In some embodiments, sync is provided using a protocol implemented over PCIe. GPS sync, 1588, SyncE are contemplated as exemplary protocols and models for implementation. The protocol can decide who has the clock (e.g., GPS). Define which one has time, for example, radio unit, CU must provide sync to the DU, and you're going to deliver that in sub-microsecond time. Even Eth needs the benefit of silicon timestamping. More complex in PCI because Ethernet has standardized this in 1588. Could use a master/slave for sync purposes only, as well as more generally, in some embodiments.

The PCIe is proposed to be a replacement for CPRI (not one over another). We can imagine it as a proprietary fronthaul with (mainly) BOM cost benefits over the CPRI. This will affect the interface between the RRH and BBU only—no Stack/HNG/SON is essentially required.

The inventors have recognized that in many respects 2G, 3G, and 5G signals are different, but have similar properties and are treated the same for the purposes of the present disclosure and one of skill in the art would be able to implement the ideas found herein for both 2G and 3G and 5G waveforms.

The inventors have recognized that, as many 4G technologies are being used directly or in slightly modified form for 5G, the present ideas may be variously embodied in 3G/5G systems, 4G/5G systems, 2G/3G/4G/5G systems in any combination, etc., using the equivalent implementation of the present ideas and disclosures in 5G as for 4G. Some of the modes used for 5G are well based on LTE and hence as well it's possible to run 5G over LTE PHY (split options 7.1, 7.2, 7.3, 8 at least). Running 2G/3G/4G over 5G radio is possible and hence we must add it to the patent. To clarify, where the present disclosure describes 2G/3G over 4G PHY, we should add 2G/3G/4G over 5G PHY.

In some embodiments a network node may use a different split for 4G than for 5G, so that 2G and 3G may be provided separately from the same network node or cell using a different split, e.g., 2G is provided using a 4G node with an Option 7.1 split while 3G is provided using a 5G node, etc. In the case where 4G and 5G are both available, either at the same device or different devices, the present disclosure contemplates the use of 2G/3G waveforms over either 4G or 5G as appropriate.

In some embodiments, optimizations are contemplated between 2G/3G and 4G/5G, since they are being carried by the same waveform and are potentially generated by the same hardware and/or software.

Figure 3:
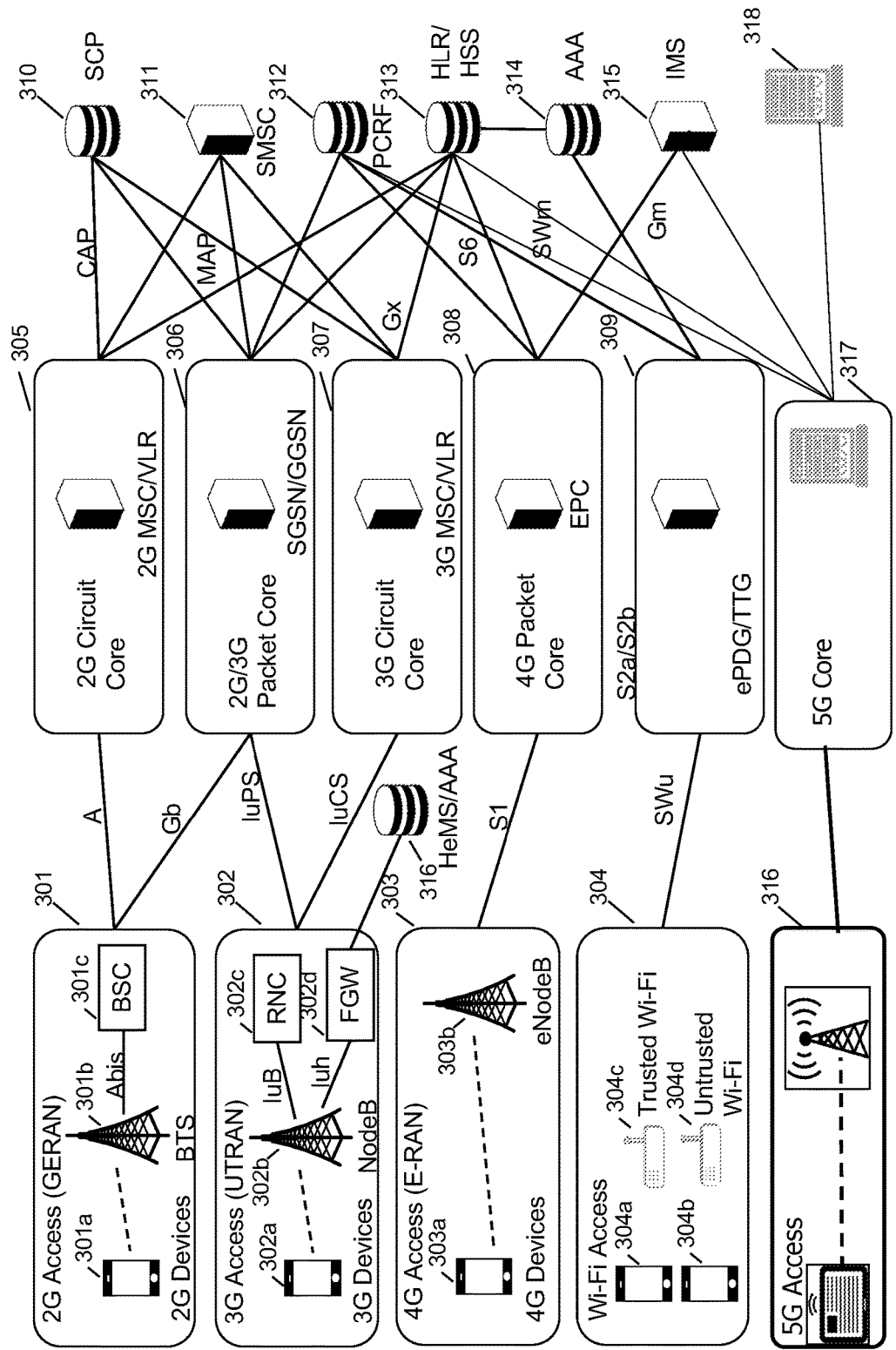
FIG. 3 is a schematic network architecture diagram for 3G and other-G prior art networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 301, which includes a 2G device 501a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 3G core 317 is shown using a single interface to 3G access 316, although in some cases 3G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 4:
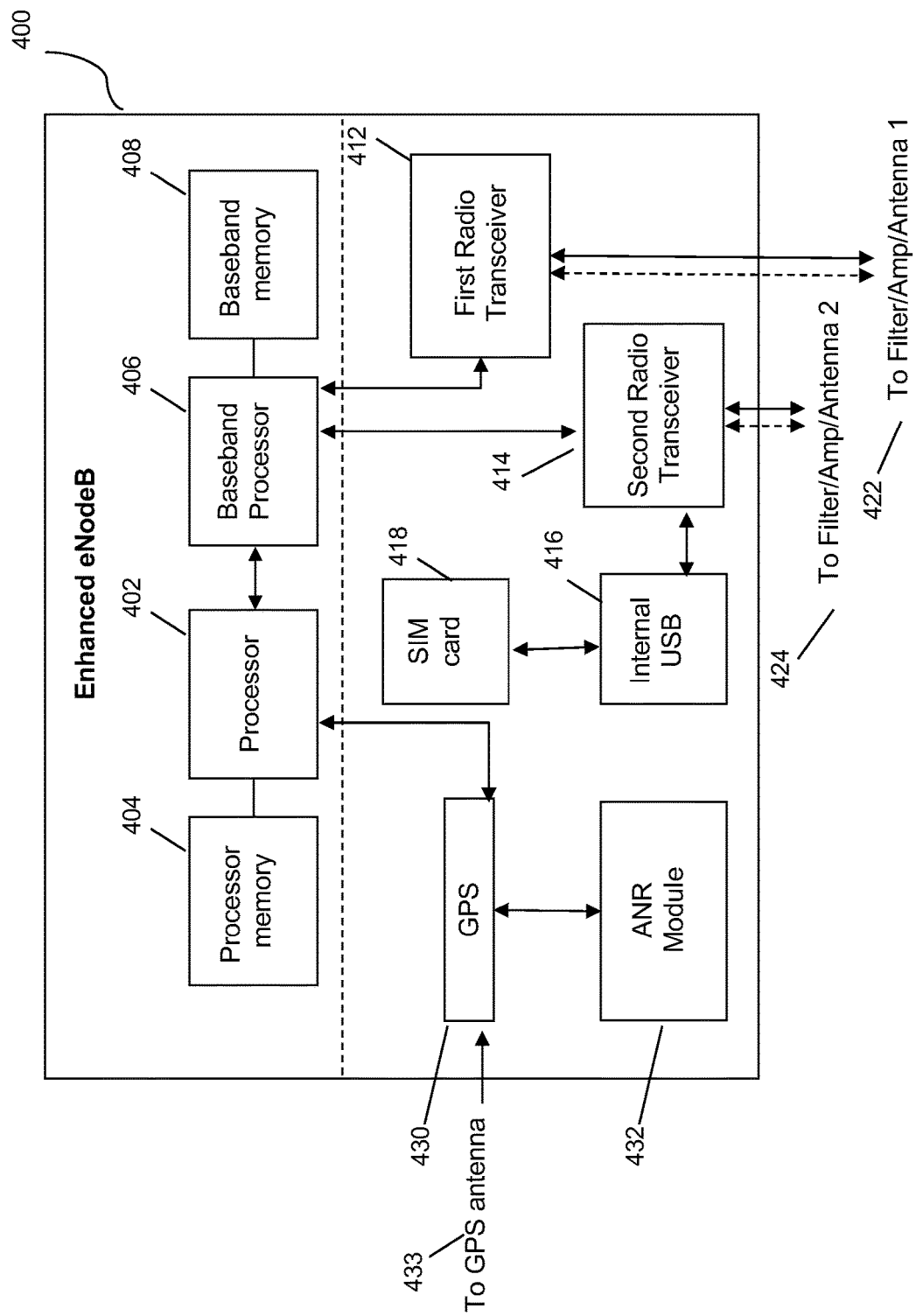
FIG. 4 is an enhanced eNodeB for performing the methods described herein, in accordance with some embodiments.

FIG. 4 is an enhanced eNodeB for performing the methods described herein, in accordance with some embodiments. Mesh network node 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
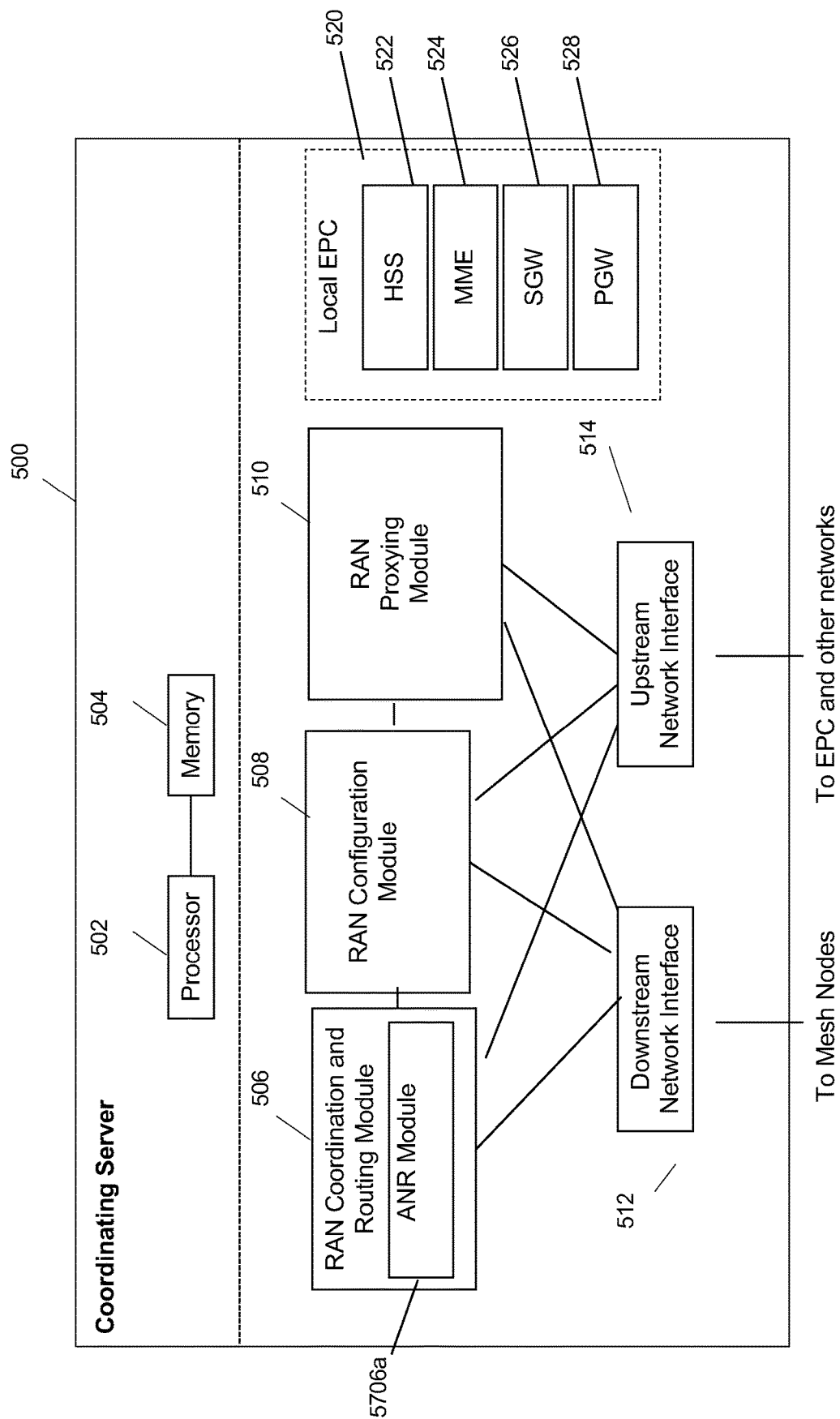
FIG. 5 is a coordinating server for providing services and performing methods as described herein, in accordance with some embodiments.

FIG. 5 is a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing fronthaul, comprising:
    providing a virtual Radio Access Network (vRAN) having a centralized unit (CU) and a distributed unit (DU); and
    interconnecting the CU and DU over an Input/Output (I/O) bus using Peripheral Component Interconnect-Express (PCIe);
    wherein the CU and the DU include a PCI to optical converter and an optical to PCI converter; and
    wherein the vRAN uses 2G/3G waveforms over a 4G frequency or 2G/3G/4G waveforms over a 5G frequency.

2. The method of claim 1, further comprising providing additional DUs in communication with the CU over the I/O bus.

3. The method of claim 1, wherein providing a CU further comprises providing the CU as a PCIe master.

4. The method of claim 1, wherein providing a DU further comprises providing the DU as a PCIe slave.

5. The method of claim 1, wherein the DU and CU are provided as at least one of a 2G, 3G, 4G and 5G network.

6. The method of claim 1, further comprising providing real-time data rate hit debug information between the CU and the DU using the PCIe mirrored memory capability.

7. The method of claim 1, further comprising providing side information to IQ sample streams.

8. The method of claim 1, further comprising providing frame synchronization between the CU and the DU using the PCIe mirrored memory capability.

9. A non-transitory computer-readable medium containing instructions for providing fronthaul which, when executed, cause a system to perform steps comprising:
    providing a virtual Radio Access Network (vRAN) having a centralized unit (CU) and a distributed unit (DU);
    interconnecting the CU and DU over an Input/Output (I/O) bus using Peripheral Component Interconnect-Express (PCIe);
    wherein the CU and the DU include a PCI to optical converter and an optical to PCI converter; and
    wherein the vRAN uses 2G/3G waveforms over a 4G frequency or 2G/3G/4G waveforms over a 5G frequency.

10. The computer-readable medium of claim 9, further comprising instructions for providing additional DUs in communication with the CU over the I/O bus.

11. The computer-readable medium of claim 9, wherein instructions for providing a CU further comprises instructions for providing the CU as a PCIe master.

12. The computer-readable medium of claim 9, wherein instructions for providing a DU further comprises instructions for providing the DU as a PCIe slave.

13. The computer-readable medium of claim 9, further comprising for wherein the DU and CU are provided as at least one of a 2G, 3G, 4G and 5G network.

14. The computer-readable medium of claim 9, further comprising instructions for providing real-time data rate hit debug information between the CU and the DU using the PCIe mirrored memory capability.

15. The computer-readable medium of claim 9, further comprising instructions for providing side information to IQ sample streams.

16. The computer-readable medium of claim 9, further comprising instructions for providing frame synchronization between the CU and the DU using the PCIe mirrored memory capability.

17. A system for providing fronthaul, comprising:
    a virtual Radio Access Network (vRAN) having a centralized unit (CU) and a distributed unit (DU);
    wherein the CU and DU are in communication with each other over an Input/Output (I/O) bus using Peripheral Component Interconnect-Express (PCIe);
    wherein the CU and the DU include a PCI to optical converter and an optical to PCI converter; and
    wherein the vRAN uses 2G/3G waveforms over a 4G frequency or 2G/3G/4G waveforms over a 5G frequency.

18. The system of claim 17, further comprising additional DUs in communication with the CU over the I/O bus.

19. The system of claim 17, wherein the system is part of at least one of a 2G, 3G, 4G and 5G network.

20. The system of claim 17, wherein the PCIe mirrored memory capability is used to provide real-time data rate hit debug information between the CU and the DU and to provide frame synchronization between the CU and the DU.

* * * * *